(12) United States Patent
Vinshtok et al.

(10) Patent No.: US 8,353,211 B2
(45) Date of Patent: Jan. 15, 2013

(54) SENSOR HOUSING

(75) Inventors: Yevgeniy Vinshtok, Allentown, PA (US); Michael J. Mcgowan, Downingtown, PA (US); Peter Breh, West Chester, PA (US)

(73) Assignee: IFM Electronic GmbH, Tettnang (DE)

( * ) Notice: Subject to any disclaimer, the term of this patent is extended or adjusted under 35 U.S.C. 154(b) by 39 days.

(21) Appl. No.: 13/095,592

(22) Filed: Apr. 27, 2011

(65) Prior Publication Data
US 2011/0247413 A1    Oct. 13, 2011

Related U.S. Application Data

(63) Continuation of application No. 11/871,969, filed on Oct. 12, 2007, now abandoned.

(51) Int. Cl.
*G01D 11/24* (2006.01)
*G01L 19/14* (2006.01)

(52) U.S. Cl. ........................................................ 73/431
(58) Field of Classification Search ..................... 73/431
See application file for complete search history.

(56) References Cited

U.S. PATENT DOCUMENTS

| 4,866,428 | A | * | 9/1989 | Hinkle | 340/636.1 |
| 4,880,974 | A | * | 11/1989 | Yamakawa | 250/216 |
| D361,057 | S | * | 8/1995 | Fayfield | D13/165 |

* cited by examiner

*Primary Examiner* — Lisa Caputo
*Assistant Examiner* — Jamel Williams
(74) *Attorney, Agent, or Firm* — Leydig, Voit & Mayer, Ltd.

(57) ABSTRACT

A sensor has a corpus comprising an insert opening through which a sensor element can be inserted in the corpus, and a cable opening for passing through a supply and/or signal line of the sensor element and a cover closing the insert opening. The cover comprises an interlock opening aligned with the cable opening. The supply and/or signal line comprises a bushing element which penetrates the cable opening of the corpus and the interlock opening of the cover.

18 Claims, 3 Drawing Sheets

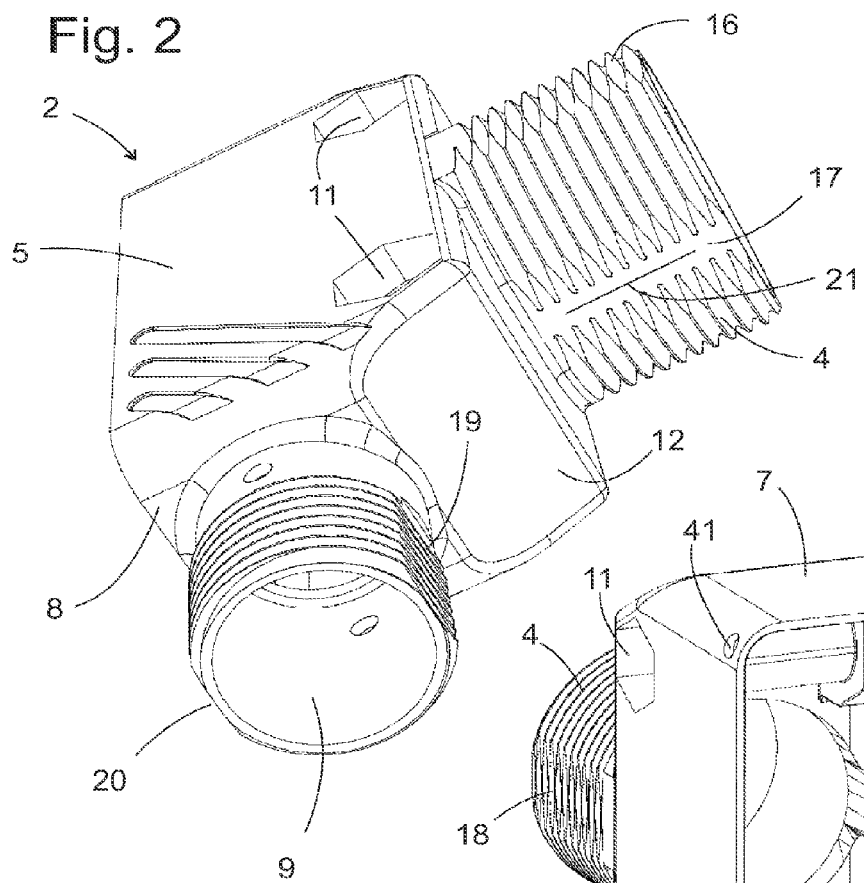
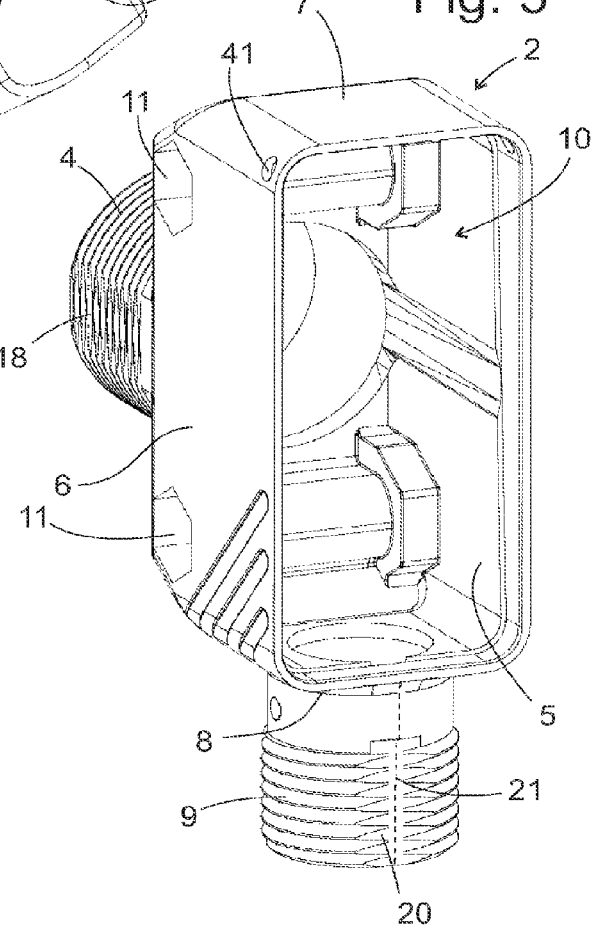

SENSOR HOUSING

CROSS REFERENCE TO RELATED APPLICATIONS

This application is a continuation of application Ser. No. 11/871,969 to Vinshtock et al. filed in the United States Patent & Trademark Office on Oct. 12, 2007 now abandoned, the specification of which is incorporated herein by reference in its entirety.

FIELD OF THE INVENTION

This invention relates to a sensor housing with a corpus comprising an insert opening through which a sensor element can be inserted in the corpus, and a cable opening for passing through a supply and/or signal line of the sensor element, and a cover closing the insert opening.

BACKGROUND OF THE INVENTION

In practice, corpus and cover of such a sensor housing are permanently and inseparably connected with each other so that a sensor element provided therein cannot be replaced or repaired if necessary, but only the complete sensor as a whole can be discarded and replaced.

A sensor housing is needed that is suitable for low-value sensors. In a low value sensor, repair is uneconomical. However, discarding such a sensor is not recycling-friendly since great expenditures are required to break down the discarded sensor into its individual parts.

SUMMARY OF THE INVENTION

It is the object of the invention to create a sensor housing which enables the assembly of a sensor with little expenditure and yet does not exclude any repair of the sensor element installed therein or, respectively, allows the breakdown of the discarded sensor into its component parts.

Further features and advantages of the invention will be apparent from the following description of exemplary embodiments, which refers to the enclosed figures.

DESCRIPTION OF THE DRAWINGS

FIGS. 1, 2 and 3 each show perspective views of a sensor housing according to the invention;

DETAILED DESCRIPTION OF THE INVENTION

Figure 1:
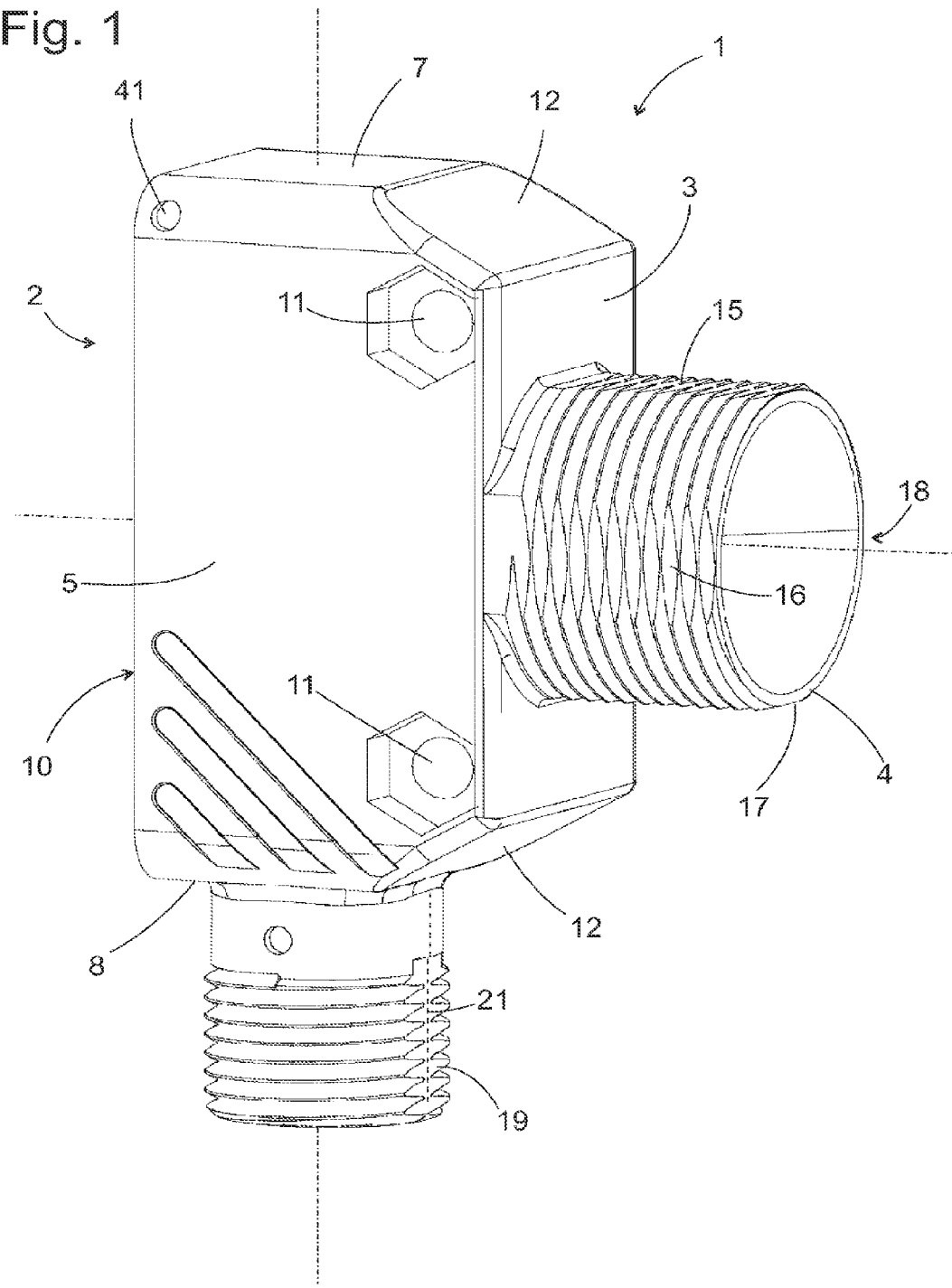

The above problems are solved with a sensor housing of the above indicated type wherein the cover comprises an interlock opening aligned with the cable opening and the supply and/or signal line comprises a bushing element which penetrates the cable opening of the corpus and the interlock opening of the cover. As the cover is interlocked by plugging in the bushing element on the corpus, additional measures for anchoring the cover will be entirely or at least partly superfluous.

On the one hand, this simplifies the assembly of the sensor housing; on the other hand, it facilitates its breakdown into its component parts when—after removal of the bushing element —corpus and cover can again be separated from each other. Expediently, the bushing element can be a plug-in connector element which allows the connection of a supply and/or signal cable provided with a complementary plug-in connector element.

When the cover comprises a plate closing the inlet opening and a wall engaging in the inlet opening, the interlock opening is expediently formed in the latter. For completing the anchoring of the cover, at least one pin can interlock one edge—facing the interlock opening—of the cover on the corpus. To be able to easily contact a sensor element installed in the sensor housing, the length of a section of the supply and/or signal line connecting the sensor element with the plug-in connector element is to be dimensioned sufficiently long to be able to pull out the plug-in connector element from the cable opening without interrupting the line. It is thus possible, in particular, to first place the sensor element with a preassembled conductor section thereon in the corpus, to pull out the conductor section from the cable opening and to contact it then with the bushing element. For this purpose, said section of the supply and/or signal line comprises at least one flexible strip conductor film.

The flexible strip conductor film preassembled on the sensor element is especially easy to contact when a complementary flexible strip conductor film preassembled on the bushing element is available. To guide the bushing element securely, the cable opening is expediently formed by a tube section projecting from a basic body of the corpus.

This tube section can expediently have an outside thread, in particular to enable the secure fastening of an external cable on the plug-in connector element. A signal passage window is preferably provided on one side of the corpus opposite the insert opening. As this window is provided in the corpus instead of, for example, in the cover, the sensor element can be mounted in the sensor housing in a precisely defined position in relation to the window.

The signal passage window is preferably formed in a tube section projecting from the basic body of the corpus. This tube section is preferably provided with an outside thread to facilitate the installation of the sensor housing in an application environment. Such an outside thread is preferably interrupted by a facet in at least one place of the circumference of its tube section.

The facet can be used as a torsional protection; it is preferably intended to provide a molding seam on it which is obtained when molding the tube section with the aid of a plurality of molding tools each molding one part of the circumference of the tube section. To exclude any contact between the molding seam and a screwed-on inside thread, the facet preferably intersects a core of the outside thread.

The outside thread is preferably interrupted by recessed facets in at least two places diametrically opposed to each other to enable its molding with the aid of only two molding tools each forming half the circumference of the tube section.

The invention is particularly advantageously applicable when at least the tube section, preferably the entire sensor housing, is made of metal. While, in the housing manufacture of plastic the stress of the molds is relatively low, so that molding seams at the boundary between the molds can be kept small for a long time, in the case of metals which must be processed at substantially higher temperatures, the stress on the molds is substantially higher so that molding seams can develop within the course of the manufacturing operation due to the wear of the molds. Furthermore, any existing molding seams in a plastic housing can be partly flattened due to the relatively low hardness of the material when it is tightly screwed whereby the contact surface between the outside thread of the tube section and the inside thread of a screwed-on nut is enlarged, whereas due to the greater hardness of the metals to be considered for sensor housings—as compared to the hardness of plastics—any deformation of the molding seams is minor when it is tightly screwed, and consequently an imbalance distribution—caused by a molding seam—of stress on the circumference of the tube section is high.

Accordingly, when metal is used instead of plastic for the tube section, it is conventionally not possible to reduce the wall thickness of the metallic tube section proportionately to the ratio of the tensile load capacities of metal and plastic. In contrast, small wall thicknesses of the tube section can be realized with the sensor housing according to the invention without the risk of rupture. The wall thickness can thus be reduced, at least in the area of the facets, to a value of under 0.7 mm, preferably even under 0.6 mm.

Since the thread is free of molding seams, extremely hard material can be used for the sensor housing or at least its first tube section; a hardness value of at least 380° Vickers is expedient or—as can be achieved in particular by using a metallic glass as the housing material—of at least 450° Vickers. Such a degree of hardness can be obtained, in particular, by using a metallic glass as the housing material.

At least on the inside, the first tube section preferably has a surface roughness of less than Rz=5.3 μm. With a housing of metallic glass, such a low roughness value can be achieved directly upon removal from the mold, without re-machining.

Apart from the above-mentioned advantages, metallic glasses on the basis of titanium and zirconium also offer excellent corrosion resistance so that sensor housings manufactured thereof are also suitable for the application in aggressive environments.

FIGS. 1 to 3 are each perspective views of one and the same sensor housing 1. The sensor housing 1 has an essentially cuboid basic body 2 with a front wall 3 from which centrally projects a tube section with outside thread, hereinafter also called threaded stub 4, longitudinal walls 5, 6 and transverse walls 7, 8, one of which—8—has a second threaded stub 9 whose diameter is smaller than that of threaded stub 4. One rear side 10 of the basic body 2 facing the front wall 3 is open.

Two openings 11 for fastening screws extend above and below the threaded stub 4 between the longitudinal walls 5, 6. Deviating from an exact cuboid form of the basic body 2, two inclined facets 12 connect the front wall 3 with the transverse walls 7, 8.

On the outer circumference of the threaded stub 4 and at an angular distance of 90°, four planar facets 15 to 18 are formed, with the facets 15, 17 standing perpendicularly on one symmetry plane of the basic body 2 set by the longitudinal axes of the threaded stubs 4, 9, and the facets 16, 18 extending parallel to it.

The threaded stub 9 comprises facets 19, 20 which are perpendicular to the symmetry plane. As to be seen, in particular, in a comparison of FIGS. 1 and 2, the facets 16, 18 parallel to the symmetry plane do not extend into the thread core of the threaded stub so that they consist of a plurality of individual planar surfaces on the individual teeth of the thread, whereas the facets 15, 17, 19, 20 perpendicular to the symmetry plane each extend into the thread core and thus form a planar surface continuously extending over the entire length of the threaded stub 4 or 9, respectively.

Any molding seam 21 possibly existing on the facets 15, 17, 19, 20 due to a manufacturing inaccuracy can thus hardly come into contact with the inside thread of a nut (not shown) screwed onto the threaded stub 4 or 9, so that the thread teeth of threaded stub and nut engaging with each other will contact each other on a large surface, and the forces occurring on the thread are thus transmitted in a uniformly distributed way into the threaded stubs 4, 9.

Figure 4:
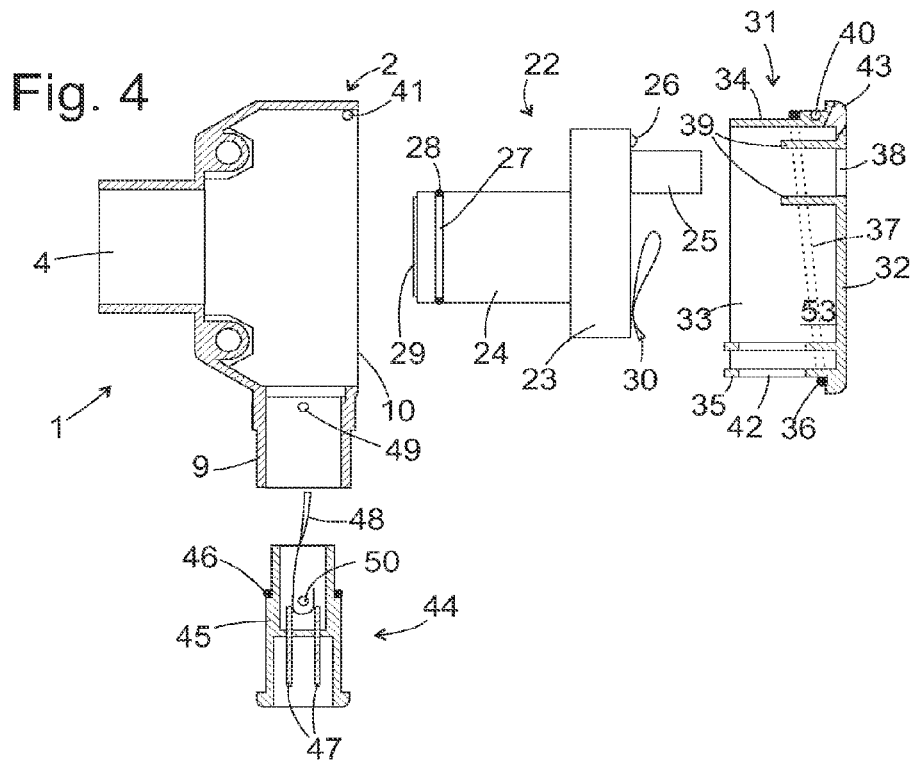
FIG. 4 shows an exploded section through the sensor housing, a sensor component intended for installation in the sensor housing, a cover, and a plug-in connector jack in an exploded view.

FIG. 4 shows diagrammatically the structure of a complete sensor with the housing 1 shown in FIGS. 1 to 3. The housing 1 is provided to accommodate a sensor component 22 which here carries an approximately cuboid basic module 23, a cylindrical section 24 engaging in the threaded stub 4, as well as—on the rear side of the basis module 23 facing away from the cylindrical section—switches 25 and operating status indicator elements such as light-emitting diodes 26 for instance. At its end facing away from the basic module 23, the cylindrical section 24 has a circumferential groove 27 in which an O-ring 28 is accommodated. When the cylindrical section 24 is introduced into the threaded stub 4, the O-ring 28 seals on the inside area of the threaded stub 4.

The front face of the cylindrical section 24 is formed by a translucent window 29 behind which a photo diode is provided as a sensor element on the inside of section 24. Additionally, a light source, such as a light-emitting diode for instance, may be provided in the section 24 and emitting through the window 29 to the outside so that the photo diode detects light reflected from an object in front of the window 29. Of course, any other sensor elements such as capacitive or inductive proximity sensors for instance can be provided as sensor elements in the section 24; in this case, the housing up to the section 24 expediently consists of a dielectric or a non-ferromagnetic metal.

Signal and supply connections of the sensor component 22 extend on a flexible printed circuit board strip 30. A cover 31 formed of plastic essentially comprises a plate 32 covering the open rear side 10 of the housing 1 and circumferential walls 33, 34, 35, extending along the edges of the plate 32. A window 38 in the plate 32 is limited by ribs 39 engaging between the walls 33. An opening 42 is formed in the lower wall 35. The lower wall 35 and one of the ribs 39 delimit a niche 53.

A shoulder 37 supporting a sealing ring 36 extends along the walls 33, 34, 35 in a plane oriented at an acute angle to the plate 32. The inclined orientation of the shoulder 37 allows to clip the cover 31 with the plate 32 oriented parallel to the rear side 10 onto the sensor housing 1 since the sealing ring 36 need not be pressed in over its entire length simultaneously between the walls 33, 34, 35 of the cover 31 and the walls 5 to 8 of the sensor housing 1.

When the cover 31 is pressed up to the stop onto the sensor housing 1, the ribs 39 touch the rear side of the basic module and thus fix it in position in the housing 1. The printed circuit board strip 30 is accommodated in the niche 53. A groove 40 of the cover 31 is in alignment with holes 41 in the longitudinal walls 5, 6 neighboring the transverse wall 7; and the opening 42 in the lower wall 35 is in alignment with the threaded stub 9. The switches 25 are inserted in the window 38 of the cover 31 and can be operated from the outside. The light-emitting diodes 26 are provided opposite a gap between the upper wall 34 and one of the ribs 39 so that they can illuminate a transparent insert 43 which forms an upper edge of the plate 32. An operating condition indicated by the light-emitting diodes 26 can thus be read off on the outside of the sensor housing 1.

A plug-in connector part 44 provided for insertion into the threaded stub 9 comprises an essentially cylindrical plastic body 45 which bears a sealing ring 46 on a shoulder and into which contact pins 47 are inserted. The contact pins 47 are connected with conductors of a flexible printed circuit board strip 48.

After the assembly of housing 1, sensor element 22 and cover 31, the free end of the printed circuit board strip 30 is first pulled out through the opening 42 and the threaded stub 9 and then contacted with the printed circuit board strip 48. Subsequently, the plastic body 45 is inserted into the threaded stub 9 with the sealing ring 46 sealing on the inside of the threaded stub 9. The plastic body 45 here engages into the opening 42 of the wall 35 of the cover 31 and interlocks it.

Complete interlocking and fixation of the cover 31 is achieved by inserting pins (not shown) through the holes 41 of the sensor housing 1 into the groove 40 of the cover 31. For fixation of the plastic body 45, short bolts can, moreover, be pressed into holes 49 of the threaded stub 9 and depressions 50 of the plastic body 45 which are aligned with them.

Figure 5:
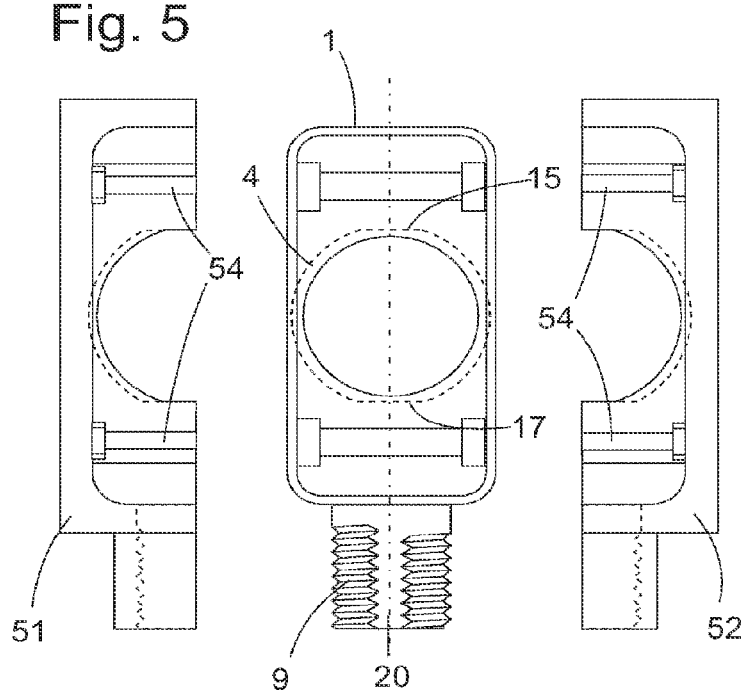
FIG. 5 a top view on the sensor housing and two molding elements used for its manufacture.

FIG. 5 illustrates diagrammatically the manufacture of the sensor housing 1. The sensor housing 1 is seen in a top view onto its open rear side; to the right and left thereof, two parts 51, 52 of a mold used for manufacture are to be seen. The pins 54 forming the passages 11 determine the direction of movement of the molded parts 51, 52 upon removal of the mold. The mold parts 51, 52 touch each other during molding along the symmetry plane of the basic body 2 so that molding seams can develop on the threaded stubs 4, 9 only in this symmetry plane, on the facets 15, 17, 19, 20.

For molding the sensor housing 1, alloys on the basis of zirconium and titanium are used which are sold by Liquidmetal Technologies, Inc., Lake Forest, Calif., U.S.A. under the designations of Liquidmetal I Alloy and Liquidmetal II Alloy. When heated, these alloys have the special feature of forming a melt of a temperature-dependent viscosity and, when cooled down sufficiently fast, an amorphous solid body of great hardness is formed from the melt.

The amorphous, glassy nature of the solid body results in the molded housing being virtually free from the crystallization-specific grainy surface structure typical for metal castings, so that the finished molded body can be removed from the mold with a surface roughness of less than Rz=5,3 μm. When these alloys are used, a wall thickness of 0.5 mm is sufficient for the walls 5 to 8 of the basic body 2, with the edge lengths of the walls between 15 and 50 mm. At their thinnest point, the facets 15, 17, 19, 20 each have a wall thickness of 0.55 mm or less.

Figure 6:
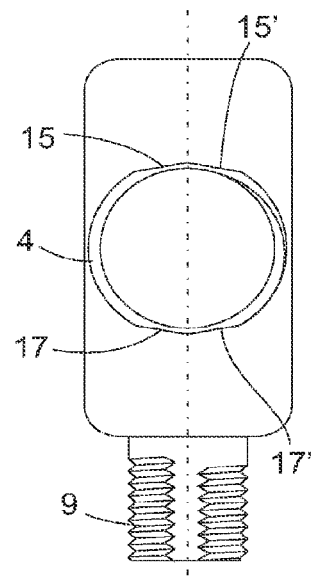
FIG. 6 a top view on the sensor housing according to a modified embodiment.

FIG. 6 shows a top view onto the front wall 3 of a sensor housing in accordance with a slightly modified embodiment of the invention. In this modification, facets 15, 15' or, respectively, 17, 17' are each molded on the threaded stub 4 on both sides of the symmetry plane and meet at a very obtuse angle at the symmetry plane. The facets 15, 17 are molded by a same molded part, the facets 15', 17' by another. The non-parallelism of the facets 15 and 17 or, respectively, 15' and 17' facilitates the removal of the finished housing from the mold; otherwise, this embodiment essentially has the same effects and advantages as the one described with reference to the FIGS. 1 to 5.

We claim:

1. A sensor housing including a corpus comprising:
    an insert opening suitable for receiving a sensor element inserted therein;
    a cable opening suitable for passing there-through a conducting line of the sensor element;
    a cover closing the insert opening, the cover comprising an interlock opening aligned with the cable opening;
    wherein a portion of the conducting line connects to a bushing element and wherein the bushing element penetrates the cable opening of the corpus and the interlock opening of the cover.

2. The sensor housing according to claim 1 characterized in that the cover comprises:
    a plate closing the insert opening; and,
    a wall engaging in the insert opening in which the interlock opening is formed.

3. The sensor housing according to claim 1 characterized in that the busing element includes at least one pin interlocking an edge of the cover.

4. The sensor housing according to claim 1 characterized in that a length of a section of the conducting line connecting the sensor element with the conducting line is dimensioned to enable pulling out the conducing line from the cable opening without interrupting the conducting line.

5. The sensor housing according to claim 4 characterized in that the section comprises at least one flexible strip conductor film.

6. The sensor housing according to claim 4 characterized in that the section comprises at least a flexible strip conductor film preassembled on the sensor element.

7. The sensor housing according to claim 1 characterized in that the cable opening is formed by a tube section projecting from a basic body of the corpus.

8. The sensor housing of claim 1 characterized in that a signal passage window is arranged in the corpus.

9. The sensor housing according to claim 8 characterized in that the signal passage window is formed in a tube section projecting from a base body of the corpus.

10. The sensor housing according to claim 7 characterized in that the tube section comprises an outside thread.

11. The sensor housing according to claim 10 characterized in that the outside thread is interrupted by a facet in at least one plane of the circumference of the tube section.

12. The sensor housing according to claim 11 characterized in that the facet intersects a core of the outside thread.

13. The sensor housing according to claim 11 characterized in that the outside thread is interrupted by facets in at least two places diametrically opposed to each other.

14. The sensor housing according to claim 1 characterized in that the corpus is formed of metallic glass.

15. The sensor housing of claim 14 characterized in that the metallic glass is an alloy on the basis of titanium and zirconium.

16. The sensor housing according to claim 14characterized in that the corpus has a hardness of at least 380 degrees Vickers.

17. The sensor housing according to claim 14 characterized in that the corps has at least locally a surface roughness of less than Rz=5.3 um.

18. The sensor housing according to claim 1 characterized in that the bushing element comprises a plug in element.

* * * * *